United States Patent Office 3,026,354
Patented Mar. 20, 1962

---

3,026,354
PROCESS FOR PREPARING 6-METHYLENE-5-OXYTETRACYCLINE
Robert K. Blackwood, Gales Ferry, Conn., assignor to Chas. Pfizer & Co., Inc., New York, N.Y., a corporation of Delaware
No Drawing. Filed Dec. 15, 1960, Ser. No. 75,903
4 Claims. (Cl. 260—559)

This invention is concerned with the production of tetracycline antibiotics, and more particularly with a new and useful process for the preparation of the valuable antibiotic, 6-methylene-5-oxytetracycline.

The tetracycline antibiotics comprise a group of biologically active perhydronaphthacene derivatives having the following essential structural features. The numbering system indicated is that employed by "Chemical Abstracts."

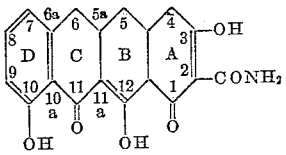

Among the biologically active members of this group are those containing the following substituent groups.

| Substituents | Common Name |
|---|---|
| 4-N(CH$_3$)$_2$,6-OH,6-CH$_3$,12a-OH | tetracycline. |
| 4-N(CH$_3$)$_2$,5-OH,6-OH,6-CH$_3$,12a-OH | 5-oxytetracycline. |
| 4-N(CH$_3$)$_2$,6-OH,6-CH$_3$,7-Cl,12a-OH | 7-chlorotetracycline. |

Another member of the group is 6-deoxy-6-demethyl-6-methylene-5-oxytetracycline, for convenience referred to as 6-methylene-5-oxytetracycline, which exhibits valuable antimicrobial activity against a wide variety of disease-causing organisms.

A novel and advantageous method has now been discovered for the preparation of this antibiotic from 5-oxytetracycline-6,12-hemiketal-12-sulfuric acid ester. In accordance with the new procedure, the desired conversion is effected by contacting the hemiketal with an acid of the dehydrating type. Although a number of such acids may be used for this purpose, it is preferred to use mineral acids such as sulfuric, phosphoric, or polyphosphoric acid, as well as other acids such as hydrogen fluoride (preferably liquid), glacial acetic acid containing boron trifluoride, or trihaloacetic acids, e.g. trifluoroacetic acid. It is also preferred to employ the mineral acids in concentrated form, e.g. at least about 60% aqueous acids. Particularly valuable results are obtained with liquid hydrogen fluoride and with concentrated sulfuric acid, e.g. about 90–96%.

The reaction temperature does not appear to be critical, temperature ranging from about −25 to about 30° C. providing good results. It is, of course, desirable that the temperature selected lie between the freezing point and the boiling point of the reaction mixture, although reaction under pressure may be employed if it is desired to operate above the atmospheric boiling point. Temperatures even lower than −25° C. may be employed, but are not preferred, since the reaction rate may be inconveniently slow under such conditions. Some product may be obtained even at temperatures in excess of 30° C., but these conditions are less desirable, since they tend to result in side reactions with consequent reduction in yield. In the case of liquid hydrogen fluoride, a temperature of about 0–10° C. is most convenient, since it permits reaction at atmospheric pressure and is readily maintained by use of an ice bath. The higher boiling acids such as concentrated sulfuric acid are most conveniently employed at room temperature.

In accordance with the present invention, the starting compound is added to the acid and the mixture is permitted to stand at the selected temperature for a relatively short period of time to effect the desired conversion. Reaction time does not appear to be critical, and the optimum reaction time naturally will vary somewhat with the particular acid and reaction temperature selected. The time required for optimum yield may be determined for a given set of conditions by sampling the reaction mixture at intervals. The product is precipitated by dilution of the sample with a non-solvent, suitably ether, and the precipitated solids subjected to paper chromatography. On Whatman No. 1 paper saturated with pH 3.5 MacIlvaine buffer the desired product exhibits an R$f$ value of about 0.35 when the chromatogram is developed with 20:10:3 by volume nitromethane:chloroform:pyridine or with 20:10:5:3 by volume nitromethane:toluene:butanol: pyridine. (For greatest accuracy the specimen is run alongside a pure sample of the desired product.) The size and intensity of the characteristic spot, as measured by ultraviolet fluorescence or by bioautobiography against *Klebsiella pneumoniae*, is directly related to the content of desired product, and comparison of the chromatograms of successive specimens enables one to determine optimum reaction time. Where hydrogen fluoride at about 0–10° C. is employed, contact times ranging from about 10 to about 200 minutes, or even longer, give good results. With other acids, reaction times of up to 24 hours may sometimes be desirable.

Recovery of the 6-methylene-5-oxytetracycline from the reaction mixtures is readily effected by standard procedures. In the case of hydrogen fluoride, the product may be precipitated by dilution with ether, or the acid may conveniently be permitted to evaporate at the conclusion of the reaction, preferably with the aid of a stream of a nitrogen. The resulting residue may be purified by trituration with a non-solvent such as ether, and the ether-insoluble hydrofluoride salt freed of polar impurities by slurrying in water, adjustment to about pH 3.5–5, and extraction of the free base with a water-insoluble solvent such as ethyl acetate. The product obtained upon evaporation of the solvent may be still further refined by recrystallization from a methanol-acetone-ether-concentrated hydrochloric acid mixture, which provides 6-methylene-5-oxytetracycline crystalline hydrochloride. Alternatively, if the free base is desired, recrystallization from a solvent such as acetonitrile or a lower alkanol is appropriate.

Where a high boiling acid such as sulfuric has been employed for the reaction, recovery of the 6-methylene-5-oxytetracycline is more appropriately effected by dilution of the reaction mixture with a non-solvent for the antibiotic, e.g. with water, which results in precipitation of the product as the corresponding acid salt. Further refining or conversion to the free base or other salts may be effected by the procedures already described for purification of the hydrofluoride salt, or by any generally known methods for purification of tetracyclines, including countercurrent solvent distribution and standard chromatographic techniques.

The ultraviolet absorption spectrum of the product in 0.01 N methanolic HCl shows $\lambda_{max}$ 252 m$\mu$, $E_{1cm.}^{1\%}$, 450 and $\lambda_{max}$ 345 m$\mu$, $E_{1cm.}^{1\%}$, 302 in 0.01 N NaOH in methanol, $\lambda_{max}$ 235 m$\mu$, $E_{1cm.}^{1\%}$, 442

$\lambda_{max}$ 254 m$\mu$, $E_{1cm.}^{1\%}$, 408

$\lambda_{max}$ 385 m$\mu$, $E_{1cm.}^{1\%}$, 329

$\lambda_{max}$ 280 m$\mu$, $E_{1cm.}^{1\%}$, 329 in 0.01 N MgCl$_2$ in methanol, $\lambda_{max}$ 240 m$\mu$, $E_{1cm.}^{1\%}$, 461

$\lambda_{max}$ 277 m$\mu$, $E_{1cm.}^{1\%}$, 326

$\lambda_{max}$ 351 m$\mu$;

$E_{1cm.}^{1\%}$, 282

Infrared analysis shows principal peaks at 6.03, 6.2, 6.37 and 6.87 microns. Bioassay shows a value of 2000 to 2400 mcg./mg. (*K. pneumoniae* turbimetric assay with oxytetracycline as standard.) Elemental analysis of the product (crystallized from methanol-acetone-ether-conc. HCl) gives the following values: C, 55.0; H, 5.2; N, 5.5; Cl, 7.0; OCH$_3$, 3.4.

As will readily be appreciated, the relative proportions of hemiketal and dehydrating acid for the process of the present invention are not critical. If, as is usually the case, no non-reactive diluent is employed, a stirrable mixture afforded by about 2 to 8 ml. acid per gram of hemiketal is adequate, and there is no particular advantage to the use of more acid than this.

The 5-oxytetracycline-6,12-hemiketal-12-sulfuric acid ester required for the new process is readily prepared from 5-oxytetracycline by treatment with a sulfonating agent, whereby a sulfonic acid group is introduced at the 12-position with simultaneous formation of a 6,12-hemiketal. The oxytetracycline in an anhydrous, reaction-inert solvent is treated with a sulfur trioxide complex of N,N-dimethylaniline, dioxane, pyridine, N,N-dimethylformamide, or triethylamine, or even with sulfur trioxide itself. Although the pyridine-sulfur trioxide complex, as well as the others listed, can be used in about stochiometric proportions, an excess, generally from about 1 to 4 molar excess, based on the sulfur trioxide content, is preferred. The sulfur trioxide complexes used as reactants are difficult to obtain pure and to maintain in pure form. It is for this reason, and to insure as complete a utilization of the oxytetracycline as is possible, that an excess of sulfur trioxide complex is used.

On the basis of available information, the order of reactivity of the sulfur trioxide complexes is as follows: dioxane, pyridine, N,N-dimethylaniline, N,N-dimethylformamide, triethylamine. However, the order of reactivity of the complexes is, for present purposes, considered subordinate to an order of preference based on ease of preparation, handling and the yields of oxytetracycline sulfuric acid ester produced, which order of preference is as follows: pyridine, N,N-dimethylformamide, dioxane, N,N-dimethylaniline, triethylamine.

In addition to the preferred complexes mentioned above, the sulfur trioxide complexes of many other tertiary organic bases are suitable for preparation of the desired intermediate; for example, trimethylamine, tripropylamine, dimethylcyclohexylamine, tributylamine, dimethylbenzylamine, 1-methylpiperidine, 4-methylmorpholine, $\alpha$-picoline, $\beta$-picoline, pentamethylguanidine, pentaethylguanidine, isoquinoline.

The sulfur trioxide complexes utilized as reactants can also be produced in situ. In one modification, the sulfur trioxide is added to a solution of oxytetracycline and the sulfur trioxide carrier, for example, pyridine, in a suitable solvent. The molar ratio of sulfur trioxide to sulfur trioxide carrier should be at least 1:1. In the case of dioxane, the sulfur trioxide complex formed may contain 1 or 2 moles of sulfur trioxide per mole of dioxane. Indeed, in most instances a mixture of the mono and di-complexes is present.

In still another modification of the described preparation, the tertiary organic base-sulfur trioxide complex is generated in situ by reacting the tertiary organic base, for example pyridine, with chlorosulfonic acid as the sulfur trioxide source, in a 2 to 1 molar ratio.

For preparation of 5-oxytetracycline-6,12-hemiketal-12-sulfuric acid ester, temperatures from about —50° C. to about 100° C. can be employed. A temperature of from about 20° C. to about 70° C. is, however, preferred since it produces the desired product in particularly good yield. The in situ production of the sulfur trioxide complex, particularly via the reaction of chlorosulfonic acid and, for example, pyridine, is advantageously conducted at a temperature of from about —50° C. to about 10° C. in order to avoid side reactions. Once the in situ formation of the sulfur trioxide complex is complete, the reaction temperature can, if desired, be increased to up to about 70° C.

Suitable solvents for the reaction include tetrahydrofuran, dioxane, N,N-dimethylformamide, dimethyl sulfoxide, 1,2-dimethoxy-ethane, dimethylene glycol diethyl ether, and ethylene dichloride. Reaction of 5-oxytetracycline with the more reactive dioxane-sulfur trioxide complex is substantially complete in about 3 hours' time, whereas the less reactive triethylamine-sulfur trioxide complex requires considerably greater reaction periods, particularly at low temperatures. In the temperature range of from about 20° C. to 70° C., a reaction period of from about 3 hours to about 20 hours results in substantial conversion of oxytetracycline to the desired sulfuric acid ester.

The 5-oxytetracycline-6,12-hemiketal-12-sulfuric acid ester can be recovered from the reaction mixture by filtration. When using N,N-dimethylformamide or dimethyl sulfoxide as solvents, optimum recovery is obtained through addition of a diluent, such as water or methanol, which is miscible with the reaction solvent but is a non-solvent for the product. The product thus obtained may be slurried briefly with dilute aqueous hydrochloric acid to facilitate removal of the pyridine or other sulfur trioxide carrier, then filtered and dried. The product may be recrystallized from N,N-dimethylformamide to give the pure anhydrous compound. The 5-oxytetracycline-6,12-hemiketal-12-sulfuric acid ester produced as described is then treated with dehydrating acid in accordance with the surprisingly simple and effective process of the present invention to produce 6-methylene-5-oxytetracycline in good yield and purity.

The following examples are provided for illustrative purposes and should not be interpreted as limiting the invention, many variations of which are possible without departing from the spirit or scope thereof.

*Example I*

To a stirred solution of 4.6 gms. (0.01 mole) of anhydrous oxytetracycline in 40 ml. of dry tetrahydrofuran is added 3.5 gms. (0.021 mole) of pyridine-sulfur trioxide complex. After 16 hours' stirring at room temperature, the resulting suspension is filtered, and the solid is slurried with 25 ml. of 2% hydrochloric acid for 10 minutes, filtered and thoroughly washed with methanol followed by ether. The pale yellow crystalline 5-oxytetracycline-6,12-hemiketal-12-sulfuric acid ester melts at 210° C.

(dec.). Recrystallized from N,N-dimethylformamide, it melts at 225° C. (dec.).

*Analysis.*—Calcd. for $C_{22}H_{24}O_{12}N_2S$: 48.89% C; 4.47% H; 5.28% N; 5.29% S. Found: 49.0% C; 4.5% H; 4.9% N; 5.6% S.

It exhibits maxima in the ultraviolet region at 262 and 332 m$\mu$ with log $\epsilon$ values of 4.39 and 3.76, respectively, when dissolved in 0.01 N HCl—$CH_3OH$ solution; and at 260 and 372 m$\mu$ with log $\epsilon$ values of 4.40 and 3.70, respectively, in 0.01 N NaOH—$CH_3OH$ solution. The spectrum of the latter solution changes on standing until, after 24 hours, the absorption maxima occur at 260–265 and 336 m$\mu$. Its infrared spectrum (KBr) is characterized by strong absorption maxima at 3333, 1661, 1618, 1543, 1456, 1355, 1266, 1232, 1178, 1099, 967, 827 and 810 reciprocal centimeters.

Paper chromatography using Whatman Paper No. 1 saturated with disodium phosphate-citric acid aqueous buffer at pH 3.5 and 20:10:5:3 by volume nitromethane:toluene:n-butanol:pyridine as the mobile phase gives an Rf value of 0.65.

*Example II*

500 mg. 5-oxytetracycline - 6,12 - hemiketal-12-sulfuric acid ester, prepared as described in Example I, is added to 4 ml. dry liquid hydrogen fluoride, and the mixture is stirred for 1.5 hours at ice bath temperature. The hydrogen fluoride is then evaporated in a stream of nitrogen and the resulting gummy solids is triturated with about 15 ml. ether and filtered. The resulting solid hydrofluoride salt is further purified by suspending in water, adjusting the pH to about 4, and extracting the 6-methylene-5-oxytetracycline free base from the aqueous phase with ethyl acetate. The extract is separated and evaporated to dryness under reduced pressure. The resulting residue is triturated with ether and filtered, and the solid is recrystallized from methanol-acetone-ether-concentrated hydrochloric acid to obtain the product as a purified hydrochloride. It exhibits an Rf value of about 0.35 on Whatman No. 1 chromatographic paper saturated with disodium phosphate-citric acid aqueous buffer at pH 3.5 when developed with 20:10:3 by volume nitromethane : chloroform : pyridine or with 20:10:5:3 by volume nitromethane : toluene : butanol : pyridine.

When the reaction is repeated, varying the reaction time from 10 to 200 minutes before removal of the hydrogen fluoride, 6-methylene-5-oxytetracycline is produced in each case.

*Example III*

The preparation of Example II is repeated at 20° C. employing 90% aqueous sulfuric acid in place of hydrogen fluoride. However, this time the product is recovered from the reaction mixture by dilution with water and recrystallization of the precipitated solid. The sulfuric acid salt obtained may be converted to the free base or to other salts by the procedures employed in Example II.

*Example IV*

The preparations of Examples II and III are repeated in a series of experiments, employing one of the following acids in place of sulfuric acid:

80% phosphoric acid
Trifluoroacetic acid
Polyphosphoric acid
Boron trifluoride in glacial acetic acid 6-methylene-5-oxytetracycline is produced in each case.

What is claimed is:

1. A process for the preparation of 6-methylene-5-oxytetracycline which comprises contacting 5-oxytetracycline-6,12-hemiketal-12-sulfuric acid ester with a dehydrating acid and separating said 6-methylene-5-oxytetracycline from the resulting reaction mixture.

2. A process as in claim 1 wherein said acid is liquid hydrogen fluoride.

3. A process as in claim 1 wherein said acid is concentrated sulfuric acid.

4. A process for the preparation of 6-methylene-5-oxytetracycline which comprises contacting 5-oxytetracycline-6,12-hemiketal-12-sulfuric acid ester with liquid hydrogen fluoride at about 0–10° C. for about 10 to 200 minutes and separating said 6-methylene-5-oxytetracycline from the resulting reaction mixture.

No references cited.